(12) United States Patent
Ohashi (10) Patent No.: US 11,752,785 B2
(45) Date of Patent: Sep. 12, 2023

(54) IMAGE PRINTING APPARATUS AND METHOD OF CONTROLLING IMAGE PRINTING APPARATUS

(71) Applicant: CANON KABUSHIKI KAISHA, Tokyo (JP)

(72) Inventor: Takakazu Ohashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 17/475,659

(22) Filed: Sep. 15, 2021

(65) Prior Publication Data

US 2022/0097423 A1 Mar. 31, 2022

(30) Foreign Application Priority Data

Sep. 30, 2020 (JP) .................. 2020-165461

(51) Int. Cl.
  *B41J 11/66* (2006.01)
  *B41J 11/00* (2006.01)
  *B41J 11/70* (2006.01)
  *B26D 5/00* (2006.01)
  *G06K 15/02* (2006.01)
  (Continued)

(52) U.S. Cl.
  CPC ............. *B41J 11/663* (2013.01); *B26D 1/045* (2013.01); *B26D 5/007* (2013.01); *B26D 5/34* (2013.01); *B41J 11/0095* (2013.01); *B41J 11/706* (2013.01); *G06K 15/022* (2013.01);
  (Continued)

(58) Field of Classification Search
  CPC ..... B41J 11/663; B41J 11/0095; B41J 11/706; G06K 15/022; G06K 15/102; G06K 15/16; G06K 15/4065; B26D 1/045; B26D 5/007; B26D 5/34; B26D 5/32
  See application file for complete search history.

(56) References Cited

U.S. PATENT DOCUMENTS 9,789,709 B2 10/2017 Saiga et al.
10,124,609 B2 11/2018 Kikuchi et al.
(Continued)

FOREIGN PATENT DOCUMENTS

JP 2000-109243 A 4/2000
JP 2003-170391 A 6/2003
(Continued)

OTHER PUBLICATIONS

Extended European Search Report dated Apr. 21, 2022, in European Patent Application No. 21196811.0.

*Primary Examiner* — Yaovi M Ameh
(74) *Attorney, Agent, or Firm* — Venable LLP (57) ABSTRACT

An image printing apparatus includes a print head configured to print an image on a printing medium; a conveyance unit configured to convey the printing medium in a conveyance direction; a detection unit movable in an intersection direction intersecting the conveyance direction and configured to detect an end of the printing medium in the intersection direction; a cutting unit located downstream of a printing region of the print head in the conveyance direction and capable of cutting the printing medium by being moved in the intersection direction; and a control unit configured to control movement of the detection unit such that the detection unit detects a position of the end of the printing medium during movement of the cutting unit for a cutting operation of cutting the printing medium.

25 Claims, 8 Drawing Sheets

(51) Int. Cl.
*G06K 15/10* (2006.01)
*G06K 15/16* (2006.01)
*G06K 15/00* (2006.01)
*B26D 1/04* (2006.01)
*B26D 5/34* (2006.01)
*B26D 5/32* (2006.01)

(52) U.S. Cl.
CPC ............ *G06K 15/102* (2013.01); *G06K 15/16* (2013.01); *G06K 15/4065* (2013.01); *B26D 5/32* (2013.01)

(56) References Cited

U.S. PATENT DOCUMENTS

2007/0284812 A1* 12/2007 Hirai .................... B41J 13/0027
 271/265.01
2017/0087889 A1* 3/2017 Kikuchi .................... B41J 2/01

FOREIGN PATENT DOCUMENTS

| JP | 5874224 B2 * | 3/2016 | ............. B41J 11/70 |
| JP | 5874224 B2 | 3/2016 | |
| WO | 2018/075047 A1 | 4/2018 | |

* cited by examiner

IMAGE PRINTING APPARATUS AND METHOD OF CONTROLLING IMAGE PRINTING APPARATUS

BACKGROUND OF THE INVENTION

Field of the Invention

The present invention relates to a technique of controlling an image printing apparatus capable of cutting a printing medium.

Description of the Related Art

Among image printing apparatuses, there is a type of apparatus that uses roll paper with a large format size of A2 or larger as a printing medium. In such an apparatus, a cutting mechanism cuts the roll paper into a sheet shape for each page. Moreover, in the image printing apparatus, a sheet end position that is a position (position in the width direction) where the printing medium is set and a leading edge position of the printing medium are detected to correct misalignment of an image relative to the printing medium.

Japanese Patent Laid-Open No. 2000-109243 (hereinafter referred to as Document 1) discloses a technique of detecting a sheet end position and a leading edge position of a printing medium. In Document 1, a reflection type optical sensor capable of performing the detection without coming into contact with the printing medium is mounted as a sheet detection sensor, on a carriage holding a print head. In a series of initial operations performed in a stage before the printing, the sheet detection sensor scans the printing medium to detect the sheet end position and the leading edge position.

In Document 1, before start of a print operation, the carriage on which the sheet detection sensor is mounted is moved to the sheet end position of the printing medium to detect the end with a conveyance operation of the printing medium stopped. Meanwhile, a preparation operation of moving the printing medium and the print head mounted on the carriage to an image printing start position needs to be performed before the start of the print operation. In other words, the sheet end detection process cannot be performed simultaneously with the preparation operation before the start of the print operation and throughput of the entire print operation decreases.

SUMMARY OF THE INVENTION

An image printing apparatus according to one aspect of the present invention includes: a print head configured to print an image on a printing medium; a conveyance unit configured to convey the printing medium in a conveyance direction; a detection unit movable in an intersection direction intersecting the conveyance direction and configured to detect an end of the printing medium in the intersection direction; a cutting unit located downstream of a printing region of the print head in the conveyance direction and capable of cutting the printing medium by being moved in the intersection direction; and a control unit configured to control movement of the detection unit such that the detection unit detects a position of the end of the printing medium during movement of the cutting unit for a cutting operation of cutting the printing medium.

Further features of the present invention will become apparent from the following description of exemplary embodiments with reference to the attached drawings.

DESCRIPTION OF THE EMBODIMENTS

Embodiments of the present invention are described below with reference to the drawings. Note that the following embodiments are not intended to limit the present invention and not all of the combinations of the characteristics described in the embodiments are necessary for the solution to which the present invention is directed. Common features from different configurations are described while being denoted with the same reference numerals.

First Embodiment

Figure 1:
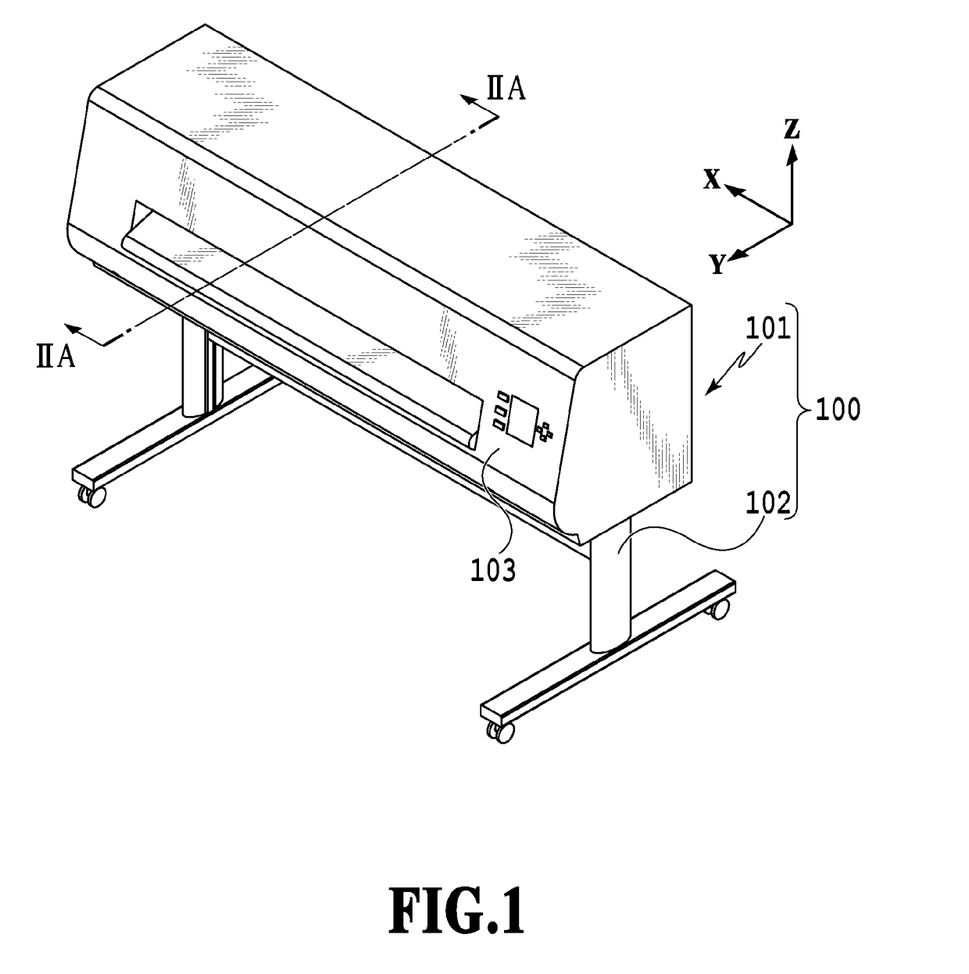
FIG. 1 is a schematic perspective view of an image printing apparatus.
Figure 2A:
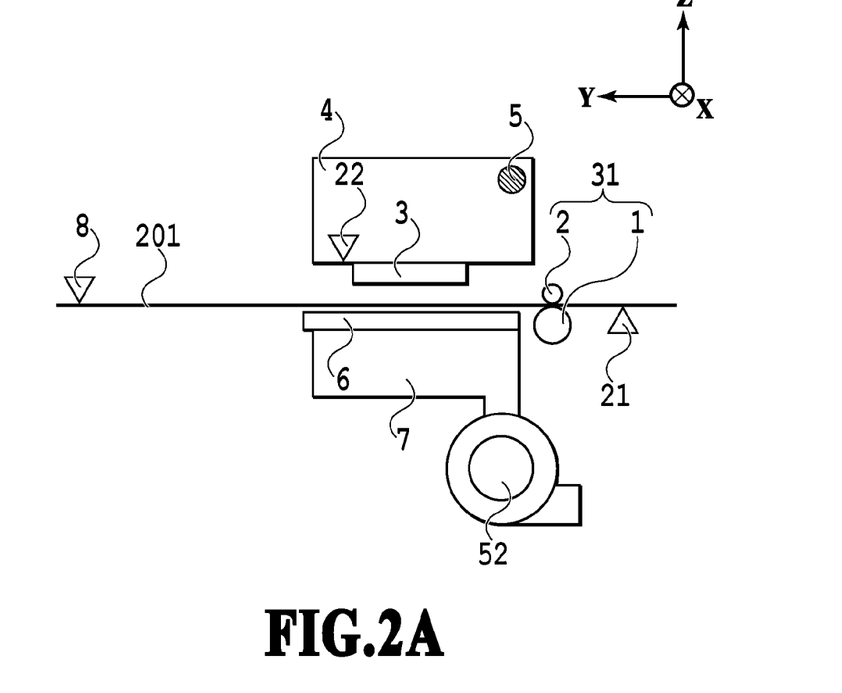
FIGS. 2A and 2B are enlarged diagrams of a part of the image printing apparatus.
Figure 2B:
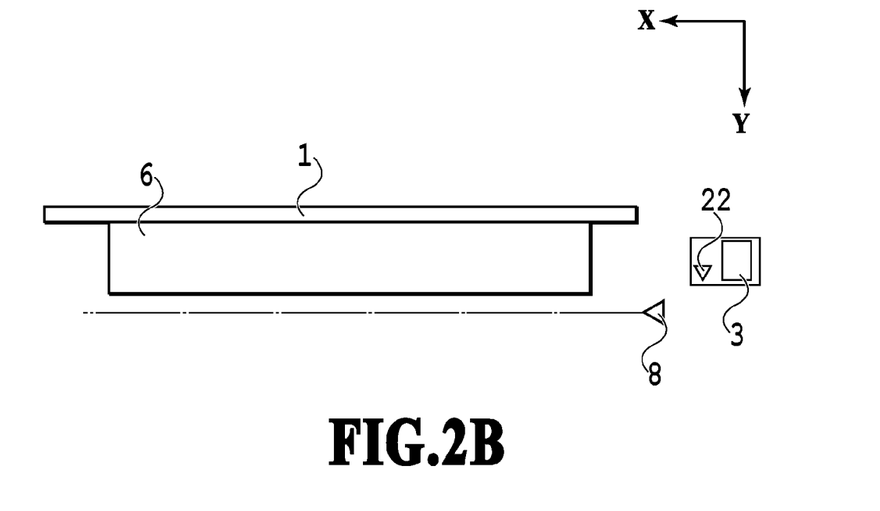

FIG. 1 is a schematic perspective view of an image printing apparatus 100 in this embodiment. FIGS. 2A and 2B are enlarged diagrams of a part of the image printing apparatus 100. FIG. 2A is a schematic cross-sectional diagram taken along the cross-sectional line IIA-IIA in FIG. 1. FIG. 2B is an XY plane diagram of the image printing apparatus 100 as viewed from above. In this specification, a Y direction is a sheet conveyance direction of a printing medium 201, a +Y direction is a direction toward the downstream side, and a −Y direction is a direction toward the upstream side. An X direction is a direction intersecting (more specifically, a direction orthogonal to) the sheet conveyance direction and a reference position to be described later is set on the −X direction side. A Z direction is the gravity direction, a +Z direction is a direction toward the upper side, and a −Z direction is a direction toward the lower side.

A schematic configuration of the image printing apparatus 100 is described below with reference to FIGS. 1, 2A, and 2B. The image printing apparatus 100 uses roll paper as the printing medium 201. As illustrated in FIG. 1, the image printing apparatus 100 includes a main body part 101 and a leg part 102 supporting the main body part 101. An operation panel 103 that displays information on the printing medium 201, various pieces of printing information, and the like and that enables setting thereof is arranged in an exterior portion of the main body part 101.

Next, description is given with reference to FIGS. 2A and 2B. A conveyance roller 1 and a follower roller 2 convey the printing medium 201 while holding the printing medium 201 therebetween. The conveyance roller 1 and the follower roller 2 are a conveyance roller pair 31 arranged upstream of a print head 3 in the sheet conveyance direction (Y direction). Rotational drive of the conveyance roller 1 by a conveyance motor 51 (FIG. 3) causes the conveyance roller pair 31 to convey the printing medium 201.

A sheet sensor 21 is arranged upstream of the conveyance roller pair 31 in the sheet conveyance direction (Y direction). The sheet sensor 21 includes a light emitting element and a light receiving element and is capable of determining whether the printing medium 201 is present or absent in a conveyance path by emitting light from the light emitting element and receiving reflected light of the emitted light with the light receiving element.

The print head 3 and an end detection sensor 22 are mounted on a carriage 4. The carriage 4 is guided along and supported on a carriage shaft 5 that is a scanning guide to be capable of reciprocating in the X direction that is an intersection direction intersecting the sheet conveyance direction (Y direction). Various light emitting diodes (LEDs) are mounted on the end detection sensor 22 and the end detection sensor 22 can detect presence or absence of the printing medium 201, the thickness thereof, and the like by causing a light receiving element to emit light from above the printing medium 201 and receiving reflected light of the emitted light. The end detection sensor 22 is thus configured to be capable of detecting end positions of many types of printing media 201 including media that are not made of paper such as a transparent film. The end detection sensor 22 can detect the end of the printing medium 201 in the X direction (end in the width direction) by moving in the X direction. Moreover, moving the end detection sensor 22 to a sheet conveyance region of the printing medium 201 allows the end detection sensor 22 to also detect a leading edge of the printing medium 201 in the sheet conveyance direction (Y direction). In a standby state, the carriage 4 waits at a position illustrated in FIG. 2B (referred to as carriage waiting position).

A platen 6 guides and supports the printing medium 201 from the back side thereof in an image printing portion (region in which the print head 3 prints an image) and guarantees that a gap is provided between the print head 3 and the printing medium 201. Multiple air suction holes are formed in the platen 6 and are connected to a suction fan 52 via a duct 7. Driving the suction fan 52 generates suction negative pressure at the air suction holes of the platen 6 and allows the printing medium 201 to be sucked to and held on the platen 6.

Figure 3:
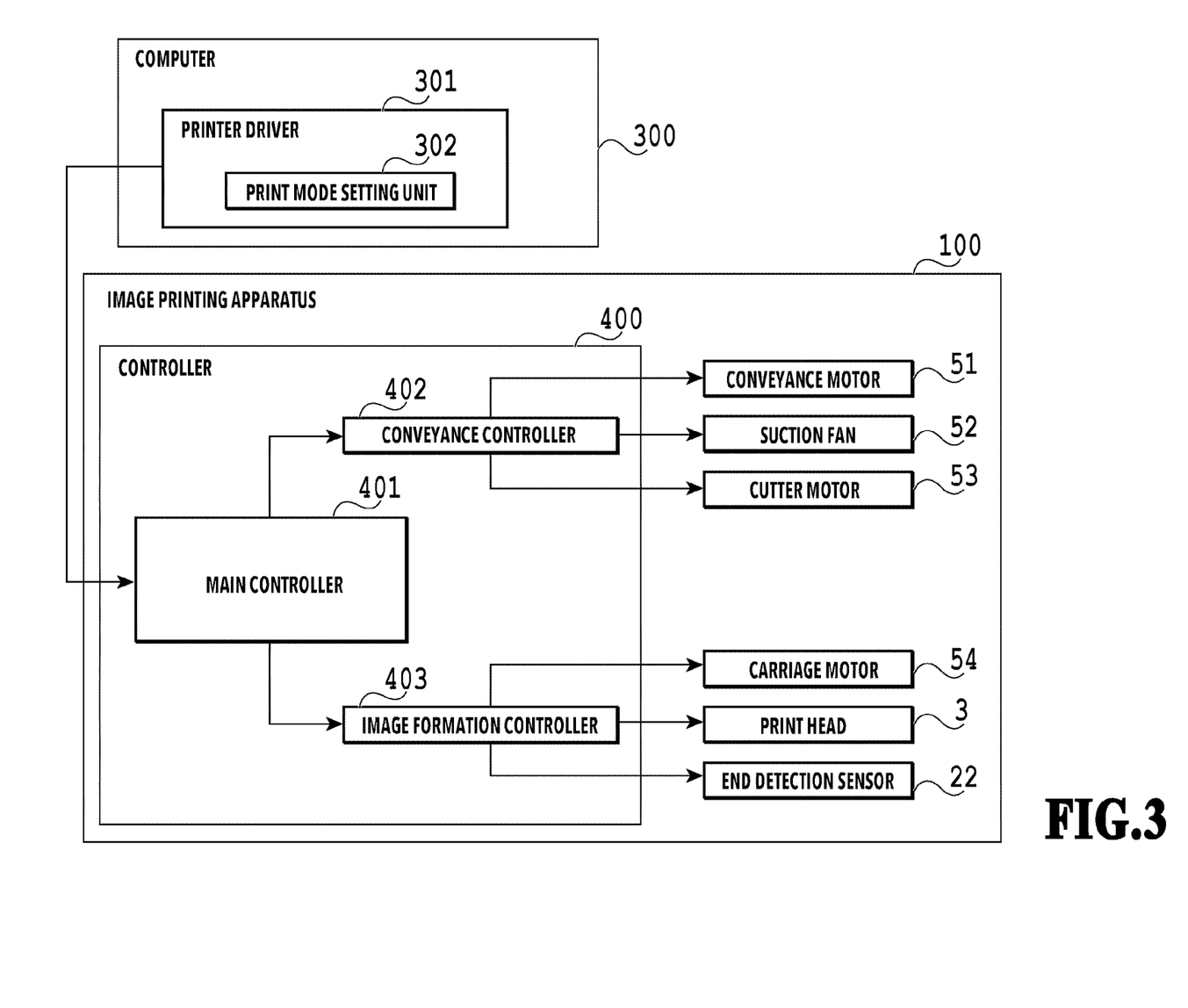
FIG. 3 is a block diagram illustrating a control configuration of the image printing apparatus.

A cutter 8 is provided downstream of the image printing portion in the sheet conveyance direction (Y direction) and is guided and supported to be capable of reciprocating in the X direction. In the embodiment, in a standby state, the cutter 8 waits at a position (referred to as cutting waiting position) on the −X direction side illustrated in FIG. 2B. The cutter 8 can cut the printing medium 201 in the X direction by being moved in the +X direction by a cutter motor 53 (FIG. 3). Specifically, the cutter 8 can cut the printing medium 201 such that the printing medium 201 has a predetermined length in the Y direction.

In printing of an image on the printing medium 201, the rotational drive of the conveyance motor 51 (FIG. 3) is performed with the leading edge of the printing medium 201 in the sheet conveyance direction held between the rollers of the conveyance roller pair 31, and the leading edge of the printing medium 201 is thereby conveyed for a predetermined amount onto the platen 6 that is the image printing portion. The image is printed in scanning for one line by forward movement or backward movement of the carriage 4 in the image printing portion and then the conveyance roller pair 31 conveys the printing medium 201 again for a predetermined pitch in the sheet conveyance direction (+Y direction). Thereafter, the carriage 4 is moved again to perform image printing of the next line. This operation is repeated and an image is printed on an entire page.

In the case where a printing operation is completed, the conveyance roller pair 31 conveys the printing medium 201 to a predetermined cutting position. Specifically, the conveyance roller pair 31 conveys the printing medium 201 in the +Y direction until a cut position of the printing medium 201 (that is, a trailing edge position of the printed page) matches the cutting position of the cutter 8. In the case where the conveyance operation of the printing medium 201 to the cutting position is completed, the rotational drive of the cutter motor 53 (FIG. 3) is performed and the cutter 8 is moved in the +X direction to cut the printed page of the printing medium 201. In the case where the cutting operation is completed, the cutter 8 is moved in the −X direction to be returned to the cutting waiting position illustrated in FIG. 2B and is set to the standby state.

FIG. 3 is a block diagram illustrating a control configuration of the image printing apparatus 100 in the embodiment. The image printing apparatus 100 is capable of starting the printing operation based on an instruction from a computer 300 that is an information processing apparatus. The computer 300 includes a printer driver 301. The printer driver 301 includes a print mode setting unit 302. The print mode setting unit 302 is a unit that allows a user to set a type of the printing medium 201, print quality, and the like.

The image printing apparatus 100 includes a controller 400. The controller 400 controls the conveyance motor 51, the suction fan 52, the cutter motor 53, a carriage motor 54, the print head 3, and the end detection sensor 22. The controller 400 is provided with a central processing unit (CPU), a read-only memory (ROM), a random access memory (RAM), a motor driver, and the like that are not illustrated and includes a main controller 401, a conveyance controller 402, and an image formation controller 403. The main controller 401 gives instructions to the conveyance controller 402 and the image formation controller 403 depending on print data received from the printer driver 301. The conveyance controller 402 drives the conveyance motor 51 while driving the suction fan 52 to convey the printing medium 201, and the image formation controller 403 prints an image at an appropriate position by using cooperation between the carriage motor 54 and the print head 3.

FIGS. 4A to 4G are explanatory diagrams illustrating an example of states from start to end of the printing in the image printing apparatus 100 of the embodiment. FIGS. 4A to 4G illustrate the states in the chronological order. FIGS. 4A to 4G each illustrate an XY plane diagram of the image printing apparatus 100 as viewed from above like FIG. 2B. A detection control method of the sheet end position of the printing medium 201 in the X direction is described with reference to FIGS. 4A to 4G.

Figure 4A:
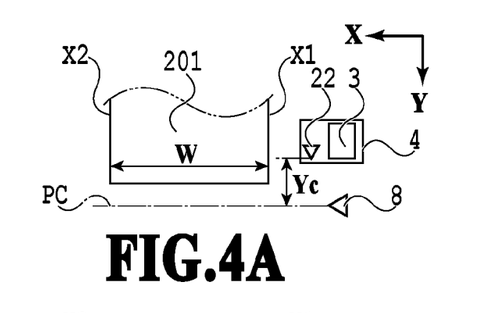
FIGS. 4A to 4G are explanatory diagrams illustrating an example of states from start to end of printing.

FIG. 4A illustrates a state before start of a printing operation for a first page. As illustrated in FIGS. 4A, an X-direction end of the printing medium 201 on the side where the print head 3 and the cutter 8 wait is referred to as reference side end X1. An end of the printing medium 201 on the opposite side to the reference side end X1 in the X direction is referred to as non-reference side end X2. The size of the printing medium 201 in the width direction may change depending on the type of the printing medium 201. In such a case, the position of the non-reference side end X2 changes but the position of the reference side end X1 does not change. Moreover, in the printing of an image, the image printing apparatus 100 sets the position of the reference side end X1 of the printing medium 201 as an origin in the X direction and specifies a position relative to the origin to set a printing position of the image on the printing medium 201. As described above, the reference side end X1 corresponds to a reference position in printing control in which an image is printed.

In FIG. 4A, the print head 3 is moved from the carriage waiting position illustrated in FIG. 2B to an image printing scan start position on the reference side end X1 side of the printing medium 201. Specifically, the print head 3 is in a state moved in the +X direction from the carriage waiting position illustrated in FIG. 2B. Moreover, the printing medium 201 is conveyed in the sheet conveyance direction (+Y direction) to an image printing start position.

Figure 4B:
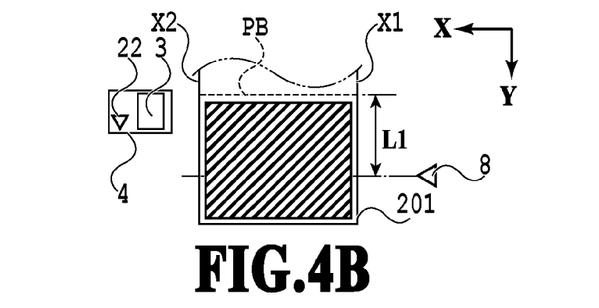

FIG. 4B illustrates a state where the printing operation for the first page is completed and the printing operation on the printing medium 201 is completed by using nozzles of the print head 3 at a most-upstream nozzle position to a most-downstream nozzle position in the Y direction. Although the print head 3 has completed the printing operation on the non-reference side end X2 side of the printing medium 201 in FIG. 4B, the print head 3 may complete the printing operation on the reference side end X1 side.

Figure 4C:
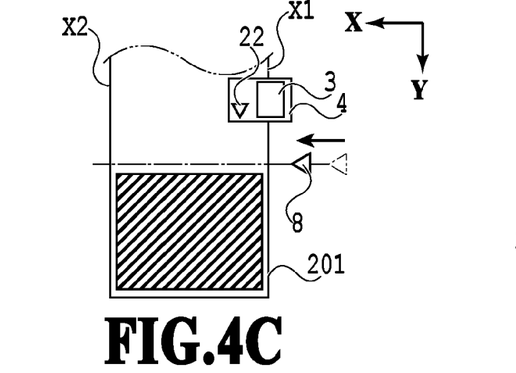

FIG. 4C illustrates a state before execution of a cutting operation for the first page. In FIG. 4C, conveyance of the printing medium 201, moving of the end detection sensor 22, and moving of the cutter 8 are performed from the state of FIG. 4B. FIG. 4C illustrates a state in which the controller 400 caused the printing medium 201 to be conveyed for a cutting position conveyance amount L1 in the sheet conveyance direction (+Y direction) from the position illustrated in FIG. 4B. The cutting position conveyance amount L1 corresponds to a distance between a cutting position PC of the cutter 8 and a trailing end position PB (cut position) of the first page.

Moreover, as illustrated in FIG. 4C, the controller 400 causes the end detection sensor 22 to be moved during the conveyance of the printing medium 201 to the cutting position that is executed in a period from completion of the printing operation for the first page to start of the cutting operation for the first page. Specifically, the controller 400 causes the carriage 4 to be moved such that the end detection sensor 22 is moved from a printing operation completion position illustrated in FIG. 4B to a sheet end position detection start position illustrated in FIG. 4C. The end detection sensor 22 can thereby quickly detect the sheet end position in the case where an operation of detecting the sheet end position is started.

Moreover, the controller 400 causes the cutter 8 to be moved from a second waiting position (cutting waiting position) that is illustrated by a dotted line in FIG. 4C to a first waiting position that is a position closer to the printing medium 201 than the second waiting position is and that is illustrated by a solid line, during the conveyance of the printing medium 201 to the cutting position. The distance that the cutter 8 is moved to perform the cutting in the cutting operation for the first page is thereby reduced and the cutting time can be thus reduced. Note that, if the cutter 8 is located at the first waiting position in the printing operation for the first page, there is a risk that the printing medium 201 comes into contact with the cutter 8 due to sheet lifting of the printing medium 201 or the like in the case where the printing medium 201 is conveyed and the leading edge position of the printing medium 201 in the sheet conveyance direction comes close to the cutting position PC. In this case, jam occurs in some cases. Accordingly, in the embodiment, the cutter 8 is moved to the first waiting position during the conveyance of the printing medium 201 to the cutting position in which the leading edge position of the printing medium 201 in the sheet conveyance direction is located downstream of the cutting position PC in the sheet conveyance direction. Although description is given of the example in which the cutter 8 is moved to the first waiting position during the conveyance of the printing medium 201 to the cutting position PC, the present invention is not limited to this example. The cutter 8 may be moved to the first waiting position during the printing operation by the print head 3 as long as the leading edge of the printing medium 201 is located downstream of the cutting position PC in the sheet conveyance direction.

Figure 4D:
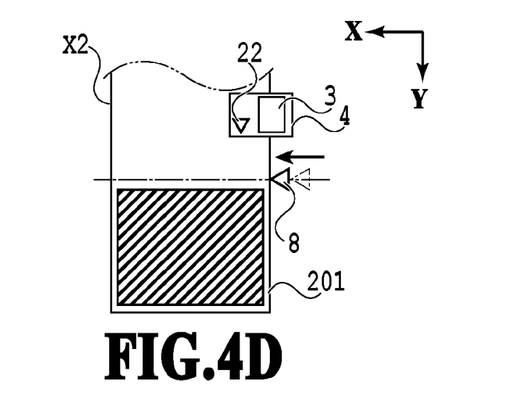

FIG. 4D illustrates a state where the cutter 8 starts the cutting for the first page. As illustrated in FIG. 4C, in the case where conveyance of the trailing end position PB of the printing medium 201 to the cutting position PC of the cutter is completed, the cutter 8 is moved in the +X direction from the first waiting position illustrated by a dotted line in FIG. 4D by control of the controller 400. In the case where the cutter 8 is at a position where it starts cutting the printing medium 201 as illustrated in FIG. 4D, there is a risk that the printing medium 201 is lifted in the +Z direction or shifted in the +X direction near the sheet end position detection region due to pressing of the printing medium 201 by the cutter 8. Accordingly, if the end detection sensor 22 detects the sheet end position at the timing at which the cutter 8 starts cutting the printing medium 201 as illustrated in FIG. 4D, there is a risk of erroneous detection. Note that this phenomenon affects the end on the cut start side (reference side end X1 in the embodiment) but does not affect the end on the cut end side (non-reference side end X2 in the embodiment). In the embodiment, the controller 400 performs control such that the cutter 8 starts cutting the printing medium 201 after predetermined time (for example, 0.1 s) elapses from the start of the movement of the cutter 8 from the first waiting position in the +X direction.

Figure 4E:
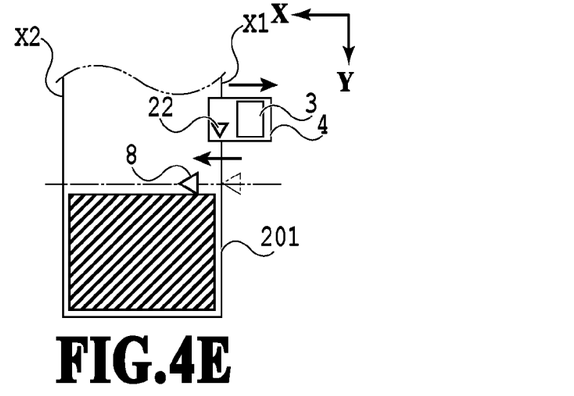

FIG. 4E illustrates a state where the end detection sensor 22 detects the sheet end position. After the cutter 8 starts cutting the printing medium 201 as illustrated in FIG. 4D, the controller 400 causes the end detection sensor 22 to be moved in the −X direction. The end detection sensor 22 can thereby detect the reference side end X1 of the printing medium 201.

In this case, the platen 6 is arranged near the sheet end position detection region. Even if the printing medium 201 is lifted in the +Z direction or shifted in the +X direction, the printing medium 201 quickly returns to its original position due to the suction force of the platen 6 and the stiffness of the printing medium 201. Thus, the sheet end position can be stably detected by setting the detection timing of the sheet end position of the printing medium 201 later than the start of cutting by the cutter 8. In other words, performing the detection operation of the reference side end X1 by the end detection sensor 22 after the start of cutting by the cutter 8 enables stable detection of the sheet end position even if lifting or shifting of the printing medium 201 temporarily occurs due to the start of cutting by the cutter 8. Specifically, in the embodiment, the movement timing of the end detection sensor 22 is controlled such that the end detection sensor 22 detects the reference side end X1 of the printing medium 201 0.25 s after the start of cutting of the printing medium 201 by the cutter 8.

Note that the conveyance roller pair 31 conveys the printing medium 201 and the end position of the printing medium 201 is sometimes misaligned due to skewing of the printing medium 201 or moving of the printing medium 201 itself in the X direction. Accordingly, the reference side end X1 of the printing medium 201 is detected for each page and an image printing region for the next page is corrected in the X direction to correct misalignment of an image relative to the printing medium 201.

Figure 4F:
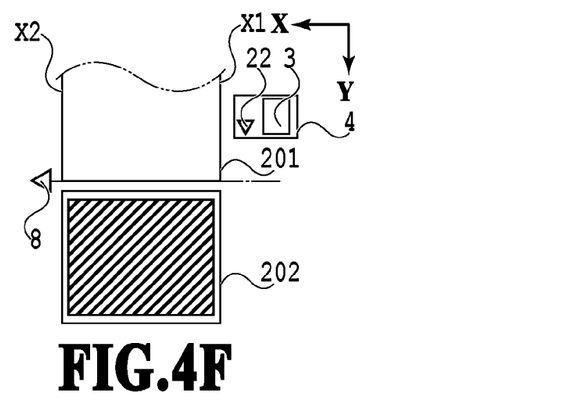

FIG. 4F illustrates a state where the cutting operation for the first page is completed. In FIG. 4F, the cutter 8 is moved in the +X direction to the cutting completion position illustrated by a solid line and the first page is cut at the trailing end position PB of the first page. A cut printed matter 202 is discharged by its own weight.

Figure 4G:
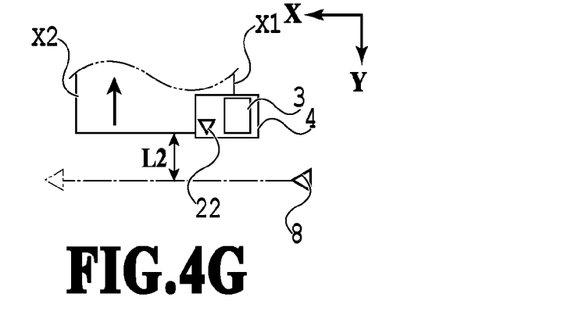

FIG. 4G illustrates a state where the end detection sensor 22 detects the leading edge position of the printing medium 201 in the sheet conveyance direction. As described above, the end detection sensor 22 can detect the leading edge position of the printing medium 201 in the sheet conveyance direction (Y direction) in addition to the end of the printing medium 201 in the X direction (end in the width direction). In FIG. 4G, the cutter 8 is in a state of an operation of returning from the cutting completion position, illustrated by a dotted line, to the second waiting position, illustrated by a solid line, in the −X direction (hereinafter, referred to as return operation). The controller 400 causes the end detection sensor 22 to be moved to a position above the printing medium 201. In this state, the controller 400 causes the printing medium 201 to be conveyed in a return direction (−Y direction) relative to the sheet conveyance direction and the end detection sensor 22 can thereby detect the leading edge position of the printing medium 201.

Assume that a conveyance distance from the leading edge position of the printing medium 201 (that is, the cutting position PC of the cutter 8) in FIG. 4F to the position where the leading edge of the printing medium 201 is detected in FIG. 4G is L2. Ideally, the conveyance distance L2 is equal to a distance Yc from the end detection sensor 22 to the cutting position PC in the sheet conveyance direction illustrated in FIG. 4A. However, the trailing end position PB of the printing medium 201 is sometimes misaligned with respect to the cutting position PC due to attachment position misalignment of the cutter 8 and physical properties such as stiffness of the printing medium 201. In such a case, the conveyance distance L2 is not equal to the distance Yc from the end detection sensor 22 to the cutting position PC of the cutter 8 and the cutting position is misaligned.

Accordingly, the controller 400 corrects the image printing start position of the printing medium 201 and the conveyance control of the cutting position conveyance amount L1 for the next page and beyond while assuming that cutting position misalignment $\Delta Yc = L2 - Yc$. Description is given by using a specific example. In the embodiment, the distance Yc from the end detection sensor 22 to the cutting position PC of the cutter 8 is assumed to be 70 mm. In this case, for example, if the cutting position PC is misaligned by 1 mm in the +Y direction with respect to the conveyance direction Y, $\Delta Yc = +1$ mm $(= L2$ (71 mm)$-Yc$ (70 mm)). In this case, the cutting position PC and the trailing end position PB can be aligned by setting the cutting position conveyance amount for the next page to L1=L1 (70 mm)+ $\Delta Yc$ (1 mm)=71 mm. Note that such a detection operation of the leading edge position by the end detection sensor 22 basically only needs to be performed once after the sheet setting but does not affect the throughput in the case where the next print data is not received. Accordingly, in the case where the next print data is not received, the detection operation of the leading edge position by the end detection sensor 22 may be executed again to update the cutting position misalignment $\Delta Yc$ after the completion of the cutting operation. Meanwhile, the configuration may be such that, in the case where the detection operation of the leading edge position is already performed and the next print data is received, the detection operation of the leading edge position of the printing medium 201 is not executed. In this case, the print head 3 and the printing medium 201 can be moved to the positions illustrated in FIG. 4A to be set to a state before start of a printing operation for the second page, simultaneously with the return operation of the cutter 8. Since an operation prior to start of printing of the second page can be executed simultaneously with the return operation of the cutter 8, the throughput can be improved.

Although the aforementioned description is an example of the states from the start to the end of the printing of the first page, similar control can be performed for the second page and beyond.

Figure 5:
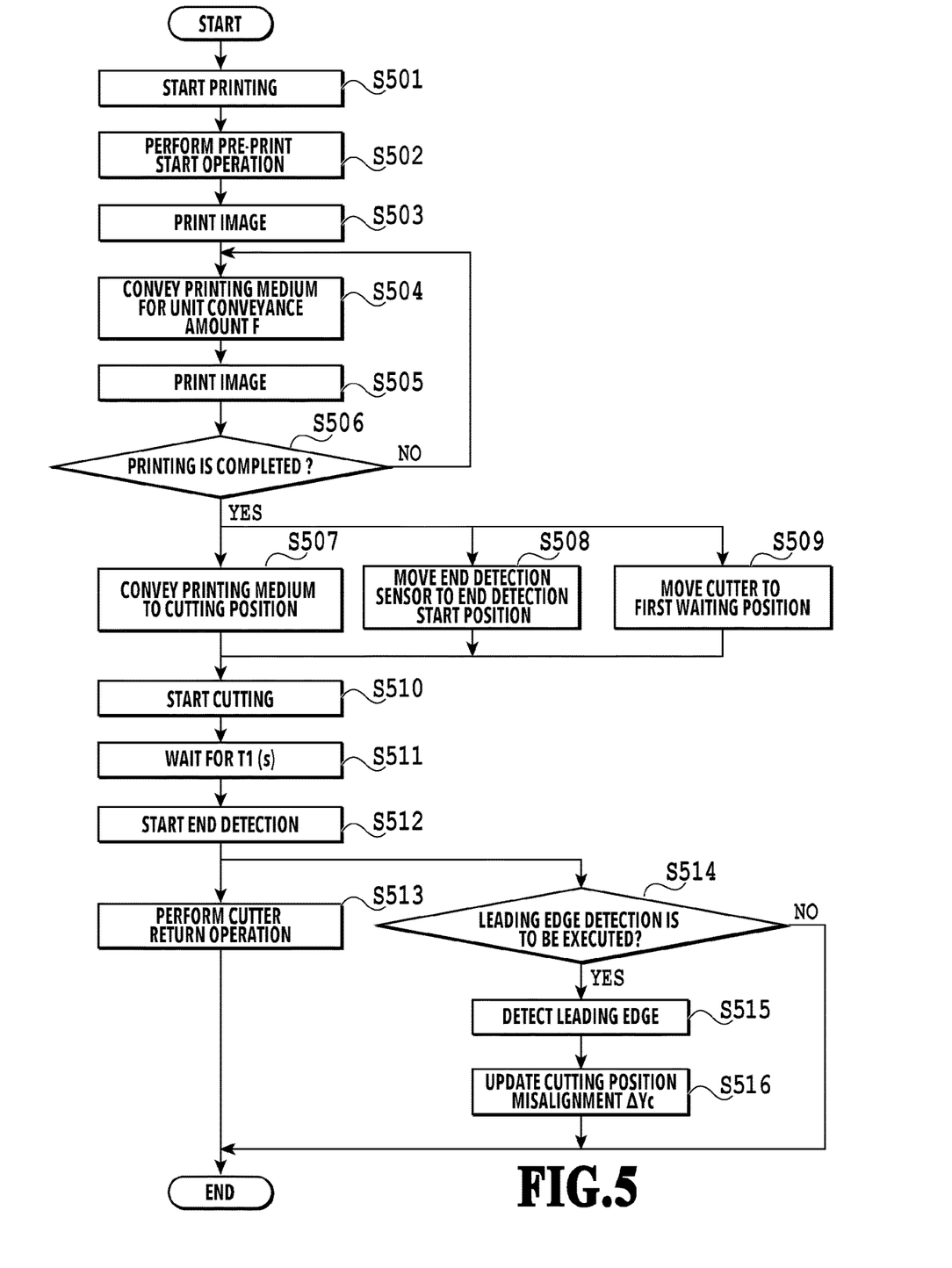
FIG. 5 is a flowchart illustrating an image printing procedure from the start to the end of the printing.

FIG. 5 is a flowchart illustrating an image printing procedure from the start to the end of the printing on the printing medium 201 in the embodiment. The CPU included in the controller 400 reads out a program stored in the ROM or the like to the RAM and executes it to perform the flowchart illustrated in FIG. 5. Note that the sign "S" in the description of the processes means that the processes are steps in the flowchart (the same applies hereinafter in this specification). The flowchart illustrated in FIG. 5 is started in the case where the image printing apparatus 100 receives the print data from the printer driver 301. Note that the flowchart may be started in the case where the image printing apparatus 100 obtains the print data stored inside the image printing apparatus 100.

In S501, the controller 400 receives the print data and then starts the printing operation. In S502, the controller 400 causes the print head 3 to be moved to the image printing scan start position and causes the printing medium 201 to be conveyed to the image printing start position (see FIG. 4A). Next, in S503, the controller 400 prints an image of one line by performing scanning of the print head 3. Then, in subsequent S504, the controller 400 causes the printing medium 201 to be conveyed for a unit conveyance amount F, which is conveyance to an image printing position for the next line. Next, in S505, the controller 400 prints an image of one line by performing scanning of the print head 3. The conveyance operation in S504 and the printing operation in S505 are alternately and repeatedly executed until the controller 400 determines that the image printing for the last line is completed and the printing is completed in S506 (see FIG. 4B).

In the case where the image printing for the last line is completed, the controller 400 performs parallel processes in S507 to S509. In S507, the controller 400 causes the printing medium 201 to be conveyed for the cutting position conveyance amount L1. Specifically, the trailing end position PB of a page of the printing medium 201 is moved to the cutting position PC of the cutter 8. In S508, the controller 400 causes the end detection sensor 22 to be moved to the sheet end position detection start position, in parallel with the conveyance operation of the printing medium 201 for the cutting position conveyance amount L1 in S507. Moreover, in S509, the controller 400 causes the cutter 8 to be moved from the second waiting position to the first waiting position, in parallel with the conveyance operation of the printing medium 201 for the cutting position conveyance amount L1 in S507. Specifically, S507 to S509 achieve the state illustrated in FIG. 4C.

In S510, in the case where at least the conveyance operation of the printing medium 201 for the cutting position conveyance amount L1 in S507 is completed, the controller 400 starts movement of the cutter 8 that is the cutting operation. In S511, the controller 400 waits for predetermined time (T1 time) from the start of the movement of the cutter 8 that is the cutting operation. After waiting for the T1 time in S511, in S512, the controller 400 starts movement of the end detection sensor 22 that is the detection operation of the reference side end X1. In the embodiment, the cutter 8 is controlled to start cutting the printing medium 201 0.1 s after the start of the movement from the first waiting position in the +X direction. Meanwhile, the controller 400 performs control such that the end detection sensor 22 detects the reference side end X1 0.2 s after the start of the movement from the sheet end position detection start position. In the embodiment, the controller 400 sets the T1 time such that the end detection sensor 22 detects the reference side end X1 of the printing medium 201 0.25 s after the start of the cutting of the printing medium 201 by the cutter 8. Thus, the T1 time from the start of the movement of the cutter 8 from the first waiting position in the +X direction to the start of the movement of the end detection sensor 22 is set to 0.15 s. Specifically, the end detection sensor 22 is controlled to detect the reference side end X1 of the printing medium 201 0.35 s (0.15 s+0.2 s) after the start of the movement of the cutter 8 from the first waiting position in the +X direction. The image printing start positions of the printing medium 201 for the next page and beyond are thereby corrected. In the case where the cutter 8 operates and completes the cutting of the printing medium 201 at the trailing end position PB of the page after the operation of S512, operations of S513 and S514 are performed in parallel. In S513, the controller 400 executes the return operation of the cutter 8 to the second waiting position. In S514, the controller 400 determines whether to cause the end detection sensor 22 to execute the detection operation of the leading edge position of the printing medium 201 in the sheet conveyance direction, in parallel with the return operation of the cutter 8 to the second waiting position in S513. If the detection operation is not to be executed, this flowchart is terminated upon completion of the process of S513. If the detection operation is to be executed, the process proceeds to S515. In S515, the controller 400 causes the printing medium 201 to be conveyed in the return direction (−Y direction) relative to the sheet conveyance direction with the end detection sensor 22 moved to a position above the printing medium 201. The end detection sensor 22 thereby detects the leading edge position of the printing medium 201. Then, in the case where the leading edge position of the printing medium 201 is detected in S515, in S516, the controller 400 updates the cutting position misalignment ΔYc. The conveyance control of the cutting position conveyance amount L1 for the next page and beyond is thereby corrected.

Although the case where the T1 time is set such that the end detection sensor 22 detects the reference side end X1 of the printing medium 201 0.25 s after the start of the cutting of the printing medium 201 by the cutter 8 is given as an example to describe the embodiment, the present invention is not limited to this example. It is only necessary that the printing medium 201 is stable in the detection of the end position of the printing medium 201 in the X direction (width direction) by the end detection sensor 22 and the detection timing of the end detection sensor 22 is shifted at least from the timing of the start of the cutting of the printing medium 201 by the cutter 8.

Moreover, although the case where the movement of the end detection sensor 22 that is detection operation of the reference side end X1 is started T1 time after the start of the movement of the cutter 8 is given as an example to describe the embodiment, the present invention is not limited to this example. It is only necessary that the detection timing of the reference side end X1 by the end detection sensor 22 is later than the start of the cutting of the printing medium 201 by the cutter 8. Accordingly, for example, the configuration may be such that the sheet end position detection start position of the end detection sensor 22 is changed in the −X direction. The end detection sensor 22 is then controlled to detect the reference side end X1 0.35 s after the start of the movement of the end detection sensor 22. This allows the control to be performed such that the timing of the movement start of the cutter 8 and the timing of the movement start of the end detection sensor 22 are the same.

Moreover, in the case where time from the start of the movement of the cutter 8 to the start of the cutting of the printing medium 201 by the cutter 8 is long, the end detection sensor 22 may be controlled to detect the reference side end X1 of the printing medium 201 between the start of the movement of the cutter 8 and the start of the cutting by the cutter 8.

As described above, according to the embodiment, the throughput of the entire printing operation including the detection operation of the sheet end position can be improved. Specifically, the detection timing of the end detection sensor 22 is controlled such that the end detection sensor 22 detects the end position of the printing medium 201 in the width direction while the cutter 8 is moving for the cutting operation. More specifically, the detection timing is controlled such that the end detection sensor 22 detects the reference side end X1 of the printing medium 201 in the width direction after the cutter 8 starts cutting the printing medium 201. Moreover, this detection timing of the end position is a timing in the middle of the execution of the cutting operation by the cutter 8. As described above, in the embodiment, the control is performed such that the detection operation of the end position of the printing medium 201 is executed in parallel with the cutting operation of the cutter 8. This can correct misalignment of an image for each page and also improve the throughput of the entire printing operation including the detection operation of the end position.

Second Embodiment

In the first embodiment, description is given of the example in which the printing medium 201 is cut by moving the cutter 8 from the −X direction side that is the reference side toward the +X direction side that is the non-reference side. In the embodiment, description is given of an example in which the printing medium 201 is cut by moving the cutter 8 from the +X direction side that is the non-reference side toward the −X direction side that is the reference side. Then, description is given of an example in which the end detection sensor 22 detects the reference side end X1 during such movement of the cutter 8. Note that the same component elements as those in the first embodiment are denoted by the same reference numerals and description thereof is omitted.

FIGS. 6A to 6G are explanatory diagrams illustrating an example of states from start to end of the printing in the image printing apparatus 100 of the embodiment. FIGS. 6A to 6G illustrate the states in the chronological order. FIGS. 6A to 6G each illustrate an XY plane diagram of the image printing apparatus 100 as viewed from above like FIG. 2B. A detection control method of the sheet end position of the printing medium 201 is described with reference to FIGS. 6A to 6G.

In FIGS. 6A to 6G, the cutting waiting position of the cutter 8 is arranged on the non-reference side end X2 side unlike in the first embodiment. Moreover, the configuration is such that the printing medium 201 can be cut to a predetermined length by moving the cutter 8 in the −X direction with the cutter motor 53.

Figure 6A:
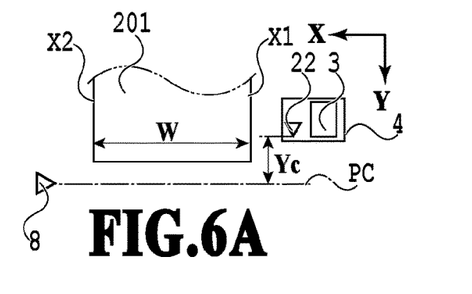
FIGS. 6A to 6G are explanatory diagrams illustrating examples of states from the start to the end of the printing.
Figure 6B:
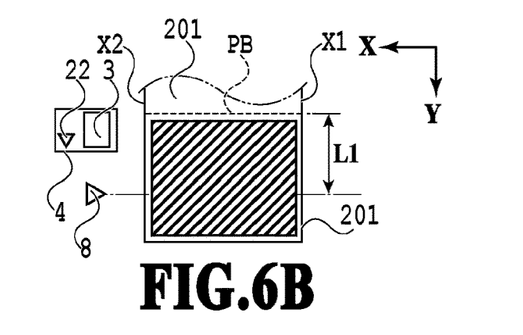

In FIGS. 6A and 6B, the printing control and the conveyance control are the same as the examples described in FIGS. 4A and 4B, although the cutting waiting position of the cutter 8 differs from that in the first embodiment as described above. Control after the completion of the printing operation for the first page is different from that in the first embodiment.

Figure 6C:
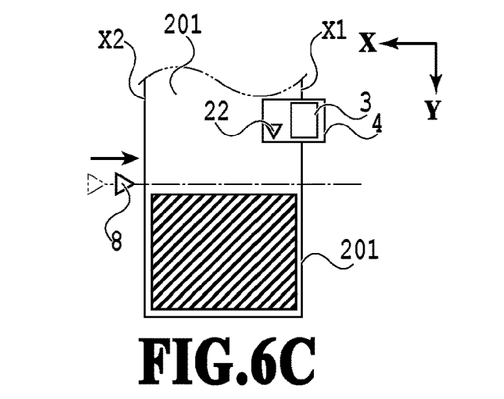

FIG. 6C illustrates a state before the execution of the cutting operation for the first page. FIG. 6C illustrates a state where the printing medium 201 is conveyed for the cutting position conveyance amount L1 in the sheet conveyance direction (+Y direction) from the position of the printing medium 201 illustrated in FIG. 6B. Moreover, as illustrated in FIG. 6C, the end detection sensor 22 is moved from the print operation completion position to the sheet end position detection start position during the cutting position conveyance of the printing medium 201 executed between the completion of the printing operation for the first page and the start of the cutting operation for the first page. Furthermore, as illustrated in FIG. 6C, the cutter 8 is moved from the second waiting position that is illustrated by a dotted line to the first waiting position that is a position closer to the printing medium 201 and that is illustrated by a solid line, during the cutting position conveyance of the printing medium 201. Note that the first waiting position of the cutter 8 in the embodiment is on the non-reference side end X2 side of the printing medium 201. Thus, the first waiting position changes depending on the width of the printing medium 201. This is because the printing medium 201 is set based on the position of the reference side end X1 and, in the case where the width of the printing medium 201 varies, the position of the non-reference side end X2 changes by an amount corresponding to the width. Note that the width W of the printing medium 201 (width W=position of non-reference side end X2-position of reference side end X1) is calculated by measuring the reference side end X1 and the non-reference side end X2 in setting of the printing medium 201.

Figure 6D:
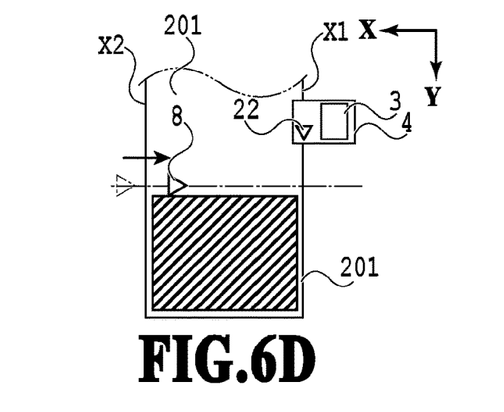

FIG. 6D illustrates a state where the end detection sensor 22 detects the sheet end position (reference side end X1). In the case where the conveyance of the printing medium 201 to the cutting position illustrated in FIG. 6C is completed, the cutter 8 is moved in the −X direction from the first waiting position illustrated by a dotted line in FIG. 6D. In the embodiment, the end detection sensor 22 is moved in the −X direction simultaneously with the start of the movement of the cutter 8 to detect the reference side end X1 of the printing medium 201. In this case, the detection timing of the sheet end position (reference side end X1) of the printing medium 201 in the embodiment is set to be earlier than completion of the cutting of the printing medium 201 by the cutter 8. The sheet end position can be thereby stably detected.

Figure 6E:
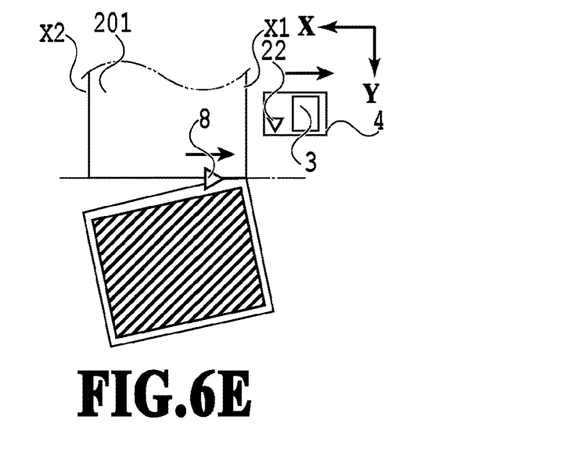

In the embodiment, the detected sheet end position (reference side end X1) is the termination position of the cutting operation by the cutter 8. In a state where the cutting of the first page is to be completed as illustrated in FIG. 6E, there is a risk that the printing medium 201 in a cut region of the first page droops down due to its own weight and the printing medium 201 lifts in the +Z direction near the sheet end position detection region. Accordingly, if the end detection sensor 22 detects the sheet end position at a timing at which the cutter 8 completes the cutting of the printing medium 201, there is a risk of erroneous detection. Note that this phenomenon occurs at the end on the cutting completion side (reference side end X1 in the embodiment) and does not occur at the end on the cutting start side (non-reference side end X2 in the embodiment).

Figure 6F:
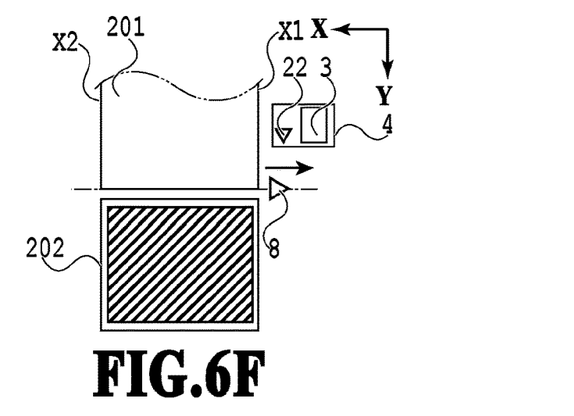
Figure 6G:
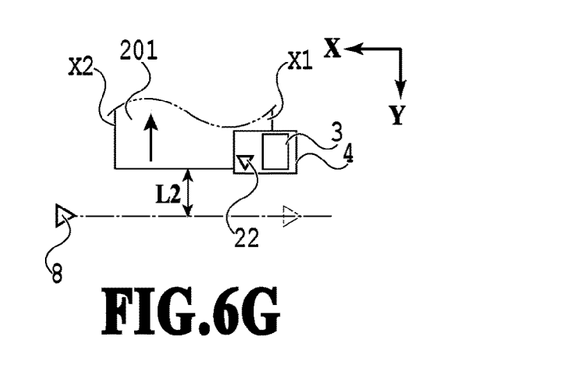

FIGS. 6F and 6G subsequent to FIG. 6E are the same control as FIGS. 4F and 4G described in the first embodiment except for the point that the movement direction of the cutter 8 is opposite to that in the first embodiment.

Figure 7:
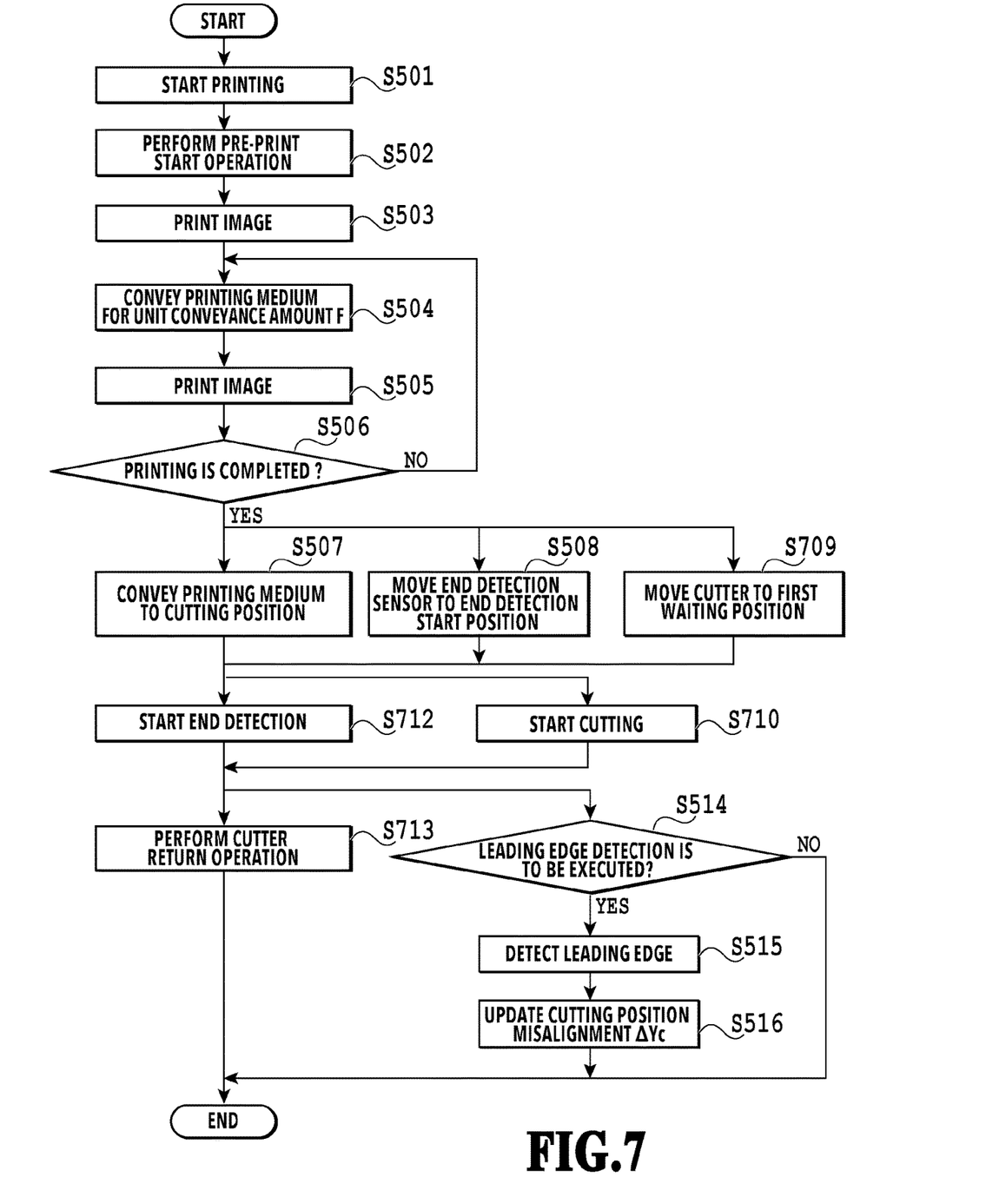
FIG. 7 is a flowchart illustrating an image printing procedure from the start to the end of the printing.

FIG. 7 is a flowchart illustrating an image printing procedure from the start to the end of the printing on the printing medium 201 in the embodiment. The CPU included in the controller 400 reads out a program stored in the ROM or the like to the RAM and executes it to perform the flowchart illustrated in FIG. 7 like the flowchart of FIG. 5. Processes of the flowchart illustrated in FIG. 7 are started in the case where the image printing apparatus 100 receives the print data as in the flowchart of FIG. 5. Note that the same processes as those in FIG. 5 are denoted by the same reference numerals as those in FIG. 5.

The processes from S501 to S506 in FIG. 7 are the same as those in the first embodiment. In the case where the image printing of the last line is completed and the controller 400 determines that the printing is completed in S506, the controller 400 performs parallel processes in S507, S508, and S709. In S507, the controller 400 performs control of conveying the printing medium 201 for the cutting position conveyance amount L1 as in the first embodiment. Moreover, in S508, the controller 400 performs control of moving the end detection sensor 22 to the sheet end position detection start position in parallel with the conveyance operation of the printing medium 201 for the cutting position conveyance amount L1 in S507, as in the first embodiment. In S709, the controller 400 causes the cutter 8 to be moved from the second waiting position to the first waiting position in parallel with the conveyance operation of the printing medium 201 for the cutting position conveyance amount L1 in S507. This embodiment is different from the first embodiment in the point that the first waiting position is on the non-reference side end X2 side. S508, S509, and S709 achieve the state illustrated in FIG. 6C.

Then, in the case where at least the conveyance operation of the printing medium 201 for the cutting position conveyance amount L1 in S507 is completed, the controller 400 performs a parallel process of operations of S712 and S710. In S712, the controller 400 starts movement of the end detection sensor 22 that is the detection operation of the reference side end X1. Moreover, the controller 400 starts movement of the cutter 8 that is the cutting operation, in parallel with the operation of S712. In the embodiment, the cutter 8 is controlled to start the cutting of the printing medium 201 0.1 s after the start of the movement and complete the cutting of the printing medium 201 0.8 s after the start of the movement. A timing at which the erroneous detection of the sheet end position may occur due to lifting of the printing medium 201 in the +Z direction near the sheet end position detection region is a timing of the completion of the cutting that is 0.6 s or more after the start of the movement of the cutter 8. Meanwhile, the end detection sensor 22 is controlled to detect the reference side end X1 0.2 s after the start of the movement. Specifically, in the embodiment, even if the end detection sensor 22 starts moving to detect the sheet end position in parallel with the movement of the cutter 8, the detection of the sheet end position is completed before the occurrence of the lifting of the printing medium 201.

In S710, in the case where the cutter 8 operates and completes the cutting of the printing medium 201 at the trailing end position PB of a page, the process proceeds to S713 and the controller 400 executes an operation (return operation) of returning the cutter 8 to the second waiting position. The control of S514 to S516 is performed along with the return operation. Since these steps are the same control as that in the first embodiment, description thereof is omitted.

Although the example of the setting in which the end detection sensor 22 detects the reference side end X1 of the printing medium 201 0.6 s before the completion of the cutting of the printing medium 201 by the cutter 8 is described in the embodiment, the present invention is not limited to this example. It is only necessary that the printing medium 201 is stable at the detection timing and the detection timing is shifted at least from the timing of the completion of the cutting.

In the case where the width of the printing medium 201 is small, the movement of the cutter 8 from the second waiting position to the first waiting position in S709 takes time. In this case, if the conveyance operation of the printing medium 201 in S507 and the movement operation of the end detection sensor 22 in S508 are completed, the movement of the end detection sensor 22 that is the detection operation of the reference side end X1 in S712 may be started. Advancing the start timing of the movement of the end detection sensor 22 to the detection start position allows the end detection sensor 22 to detect the reference side end X1 before the completion of the cutting of the printing medium 201 by the cutter 8, also in the case where the width of the printing medium 201 is small. In this case, the cutter 8 may not stop at the first waiting position and continue the movement operation that is the cutting operation in S710.

As described above, in the embodiment, the throughput of the entire printing operation including the detection operation of the sheet end position can be improved also in the configuration in which the cutter 8 starts cutting the printing medium 201 from the non-reference side end X2 of the printing medium 201. Specifically, the detection timing of the end detection sensor 22 is controlled such that the end detection sensor 22 detects the end position of the printing medium 201 in the width direction while the cutter 8 is moving for the cutting operation. More specifically, the detection timing is controlled such that the end detection sensor 22 detects the reference side end X1 of the printing medium 201 in the width direction before the completion of the cutting of the printing medium 201 by the cutter 8. As described above, in the embodiment, the control is performed such that the detection operation of the end position of the printing medium 201 is executed in parallel with the cutting operation of the cutter 8. This can correct misalignment of an image for each page and also improve the throughput of the entire printing operation including the detection operation of the end position.

Third Embodiment

In the first and second embodiments, description is given of the example in which a cutting direction of the printing medium 201 by the cutter 8 is one direction. In the embodiment, description is given of an example in which the cutting direction of the printing medium 201 by the cutter 8 is bidirectional. Since the configuration of the image printing apparatus 100 is the same as those in the first and second embodiments, description thereof is omitted.

The cutter 8 in the embodiment is configured to be capable of cutting the printing medium 201 from the reference side end X1 and the non-reference side end X2 of the printing medium 201. Accordingly, the second waiting position and the first waiting position of the cutter 8 are arranged on each of the reference side end X1 side and the non-reference side end X2 side. Thus, in the embodiment, the return operation of the cutter 8 is unnecessary and the time required for the return operation is unnecessary. This can further improve the throughput of the entire printing.

Figure 8:
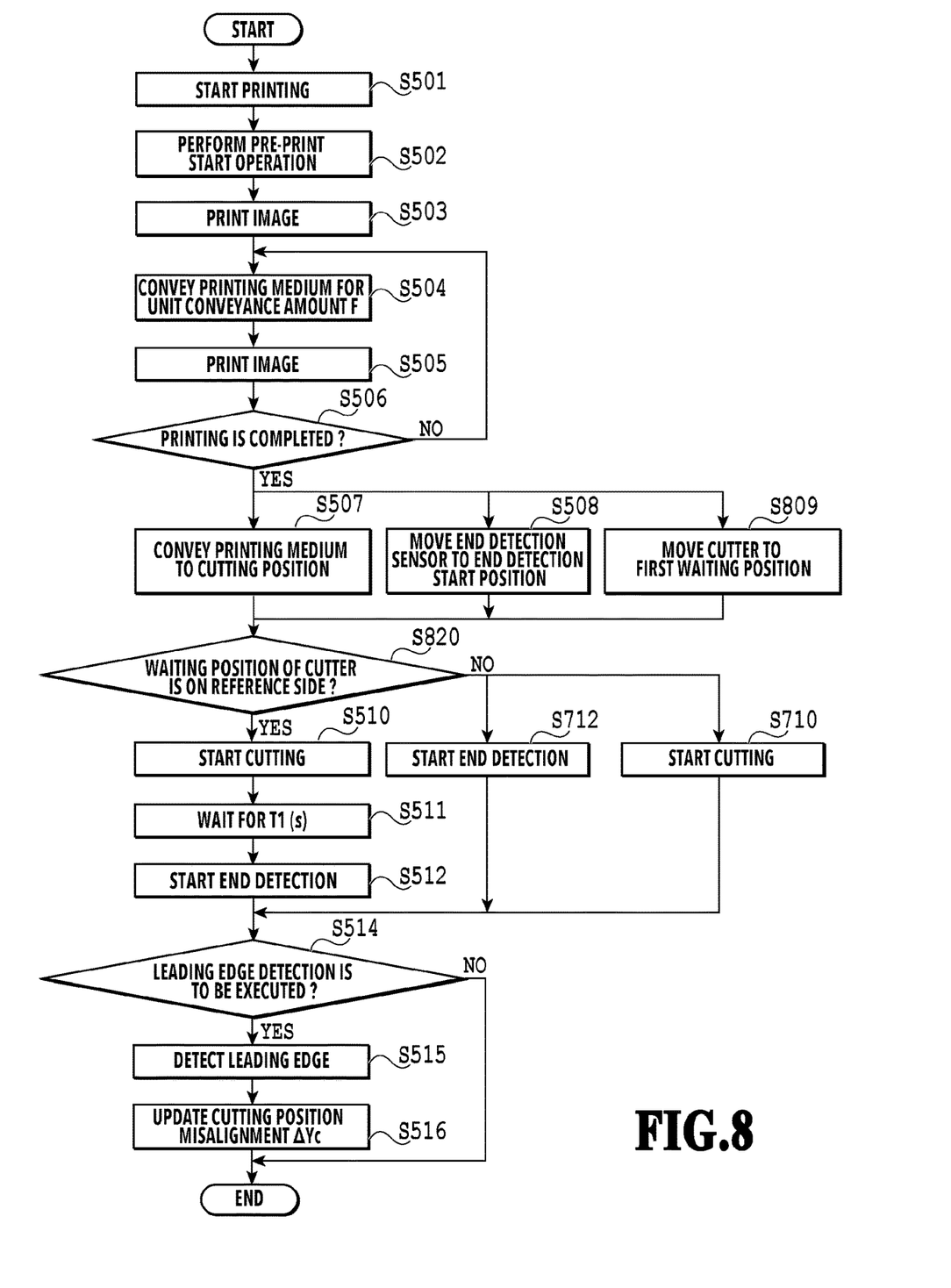
FIG. 8 is a flowchart illustrating an image printing procedure from the start to the end of the printing.

FIG. 8 is a flowchart illustrating an image printing procedure from start to end of printing on the printing medium 201 in the embodiment. The CPU included in the controller 400 reads out a program stored in the ROM or the like to the RAM and executes it to perform the flowchart illustrated in FIG. 8 like the flowcharts of FIGS. 5 and 7. Processes of the flowchart illustrated in FIG. 8 are started in the case where the image printing apparatus 100 receives the print data as in the flowcharts of FIGS. 5 and 7. Note that the same processes as those in FIGS. 5 and 7 are denoted by the same reference numerals as those in FIGS. 5 and 7.

The processes from S501 to S506 in FIG. 8 are the same as those in the first embodiment. In the case where the image printing of the last line is completed and the controller 400 determines that the printing is completed in S506, the controller 400 performs parallel processes in S507, S508, and S809. In S507, the controller 400 performs control of conveying the printing medium 201 for the cutting position conveyance amount L1 as in the first embodiment. Moreover, in S508, the controller 400 performs the control of moving the end detection sensor 22 to the sheet end position detection start position in parallel with the conveyance operation of the printing medium 201 for the cutting position conveyance amount L1 in S507, as in the first embodiment. In S809, the controller 400 causes the cutter 8 to be moved from the second waiting position to the first waiting position. The embodiment differs from the first and second embodiments in that the second waiting position and the first waiting position of the cutter 8 in this case are on the reference side end X1 side or the non-reference side end X2 side. Specifically, in the case where the cutter 8 is waiting at the second waiting position on the reference side end X1 side, the cutter 8 is moved to the first waiting position on the reference side end X1 side. Meanwhile, in the case where the cutter 8 is waiting at the second waiting position on the non-reference side end X2 side, the cutter 8 is moved to the first waiting position on the non-reference side end X2 side.

Next, in S820, the controller 400 determines whether the waiting position of the cutter 8 is on the reference side end X1 side. If the cutter 8 is on the reference side end X1 side, the operations of S510 to S512 are performed as in the first embodiment. Specifically, in the case where at least the conveyance operation of the printing medium 201 for the cutting position conveyance amount L1 in S507 is completed, in S510, the controller 400 starts the movement of the cutter 8 that is the cutting operation. Then, the movement of the end detection sensor 22 that is the detection operation of the reference side end X1 is started (S512) T1 time after the start of the movement of the cutter 8 (S511).

Meanwhile, if the waiting position of the cutter 8 is on the non-reference side end X2 side, the operations of S712 and S710 are performed as in the second embodiment. Specifically, in the case where at least the conveyance operation of the printing medium 201 for the cutting position conveyance amount L1 in S507 is completed, in S712, the controller 400 starts the movement of the end detection sensor 22 that is the detection operation of the reference side end X1. Moreover, in S710, the controller 400 starts the movement of the cutter 8 that is the cutting operation in parallel with the movement operation of the end detection sensor 22.

Then, in the case where the cutter 8 operates and completes the cutting of the printing medium 201 at the trailing end position PB of the page, the cutter 8 is moved to the second waiting position on the non-reference side end X2 if the cutter 8 has started the cutting from the reference side end X1 side. Meanwhile, the cutter 8 is moved to the second waiting position on the reference side end X1 side if the cutter 8 has started the cutting from the non-reference side end X2 side. Accordingly, the return operation of the cutter 8 does not have to be performed. Thus, the waiting position of the cutter 8 switches from page to page.

Thereafter, in S514, the controller 400 determines whether to cause the end detection sensor 22 to execute the detection operation of the leading edge position of the printing medium 201. If the detection operation is to be executed, the operations of S515 and S516 are performed. If the detection operation is not to be executed, the process is terminated. The operations of S515 and S516 are the same as those in the first embodiment and description thereof is thus omitted.

In the embodiment, in the case where the width of the printing medium 201 is small, the second waiting position of the cutter 8 on the non-reference side end X2 side may be set for each width of the printing medium 201. This is because the leading edge position of the printing medium 201 only needs to be such a position that the printing medium 201 and the cutter 8 do not come into contact with each other by the sheet lifting of the printing medium 201 or the like in the case where the printing medium 201 is conveyed and the leading edge position comes close to the cutting position PC. The time required for the cutter 8 to move from the second waiting position to the first waiting position on the non-reference side end X2 side can be thereby reduced.

As described above, in the embodiment, the throughput of the entire printing operation including the detection operation of the sheet end position can be improved also in the configuration in which the cutter 8 cuts the printing medium 201 from both of the reference side end X1 side and the non-reference side end X2 side of the printing medium 201.

Other Embodiments

Although the example in which the end detection sensor 22 is mounted on the carriage 4 on which the print head 3 is mounted and is moved by moving this carriage 4 is described in the aforementioned embodiment, the present invention is not limited to this example. For example, the end detection sensor 22 may be moved by being mounted on a movement mechanism other than the carriage 4 on which the print head 3 is mounted. Moreover, although the image printing apparatus that prints an image by performing reciprocating scanning of the carriage 4 on which the print head 3 is mounted is given as an example in the description of the aforementioned embodiments, the present invention is not limited to this example. The image printing apparatus may be an image printing apparatus using a so-called line head which is long and in which ejection ports are arranged in the width direction of the printing medium.

The example in which the origin in the X direction in the setting of the printing position of the image on the printing medium 201 is the reference side end X1 (right end of the sheet surface in each drawing) is described in the aforementioned embodiments. The origin in the X direction in the setting of the printing position of the image on the printing medium 201 may be the non-reference side end X2 (left end of the sheet surface in each drawing). Specifically, the end detection sensor 22 may be configured to detect the end position of the printing medium 201 in the width direction on the side where this end position may vary depending on the type of the printing medium, for each page.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-165461, filed Sep. 30, 2020, which is hereby incorporated by reference herein in its entirety.

What is claimed is:

1. An image printing apparatus comprising:
a print head configured to print an image on a printing medium;
a conveyance unit configured to convey the printing medium in a conveyance direction;
a detection unit movable in an intersection direction intersecting the conveyance direction and configured to detect an end of the printing medium in the intersection direction; and
a cutting unit located downstream of a printing region of the print head in the conveyance direction and capable of cutting the printing medium by being moved in the intersection direction,
wherein, in a case where an upstream side, with respect to the conveyance direction, of the printing medium on which the image has been printed by the print head is cut, when the cutting unit is moving, the detection unit moves from a detection start position on the printing medium to the end of the printing medium in order to detect the end of the printing medium.

2. The image printing apparatus according to claim 1, wherein, in the case where the position of the end to be detected by the detection unit is on the same side as an end from which the cutting of the printing medium by the cutting unit is to be started in the intersection direction, the detection unit detects the position of the end before the cutting of the printing medium by the cutting unit or after the start of cutting of the printing medium by the cutting unit.

3. The image printing apparatus according to claim 1, wherein, in the case where the position of the end to be detected by the detection unit is on the same side as an end at which the cutting of the printing medium by the cutting unit is to be completed in the intersection direction, the detection unit detects the position of the end before the completion of cutting of the printing medium by the cutting unit.

4. The image printing apparatus according to claim 1, wherein the detection unit detects a reference side end of the printing medium in the intersection direction.

5. The image printing apparatus according to claim 4, wherein the printing of a next image by the print head is performed based on a position of the reference side end detected by the detection unit.

6. The image printing apparatus according to claim 4, wherein a position of the reference side end does not change in the case where a type of the printing medium changes.

7. The image printing apparatus according to claim 1, wherein the cutting unit cuts the printing medium by being moved from a cutting waiting position in a first direction of the intersection direction and is returned to the cutting waiting position for the next cutting operation by being moved in a second direction opposite to the first direction.

8. The image printing apparatus according to claim 1, wherein the detection unit is moved to the detection start position in parallel with a conveyance operation of conveying the printing medium to a cutting position of the cutting unit, in the case where the printing of the image on the printing medium by the print head is completed.

9. The image printing apparatus according to claim 1, wherein the detection unit detects the end every time the cutting unit performs a cutting operation.

10. The image printing apparatus according to claim 1, wherein a conveyance operation of conveying the printing medium for a unit conveyance amount and a printing operation of printing an image on the printing medium by the print head are performed alternately to execute a print operation based on print data.

11. The image printing apparatus according to claim 1, further comprising a carriage on which the print head and the detection unit are mounted and that is movable in the intersection direction, wherein
the detection unit is moved in the intersection direction by movement of the carriage in the intersection direction.

12. The image printing apparatus according to claim 1, further comprising a control unit configured to control movement of the detection unit and the cutting unit.

13. The image printing apparatus according to claim 12, wherein the control unit causes the detection unit to detect a leading edge position of the printing medium by conveying the printing medium upstream with respect to the conveyance direction after completion of a cutting operation by the cutting unit, and
the control unit corrects a cutting position set in advance based on a distance between the set cutting position and a position of the detection unit and a conveyance amount up to a point of detection of the leading edge position.

14. The method according to claim 1, wherein the detection unit detects a reference side end of the printing medium in the intersection direction.

15. The method according to claim 14, wherein the printing of a next image by the print head is performed based on a position of the reference side end detected by the detection unit.

16. The image printing apparatus according to claim 12, wherein
the cutting unit is configured to be capable of cutting the printing medium by being moved from a cutting waiting position, located on a first direction side of the intersection direction, in a second direction opposite to the first direction and by being moved from a cutting waiting position, located on the second direction side, in the first direction, and
the control unit controls a movement timing of the detection unit depending on the cutting waiting position of the cutting unit.

17. The image printing apparatus according to claim 12, wherein
the cutting unit is capable of waiting at a second waiting position and at a first waiting position that is located closer to the printing medium than the second waiting position is,
the cutting unit is located at the second waiting position at least before start of the printing of the image on the printing medium by the print head, and
the control unit causes the cutting unit to be moved from the second waiting position to the first waiting position after the printing medium is conveyed and a leading edge position of the printing medium in the conveyance direction is arranged downstream of the cutting unit in the conveyance direction, and starts the movement of the cutting unit for the cutting operation from the first waiting position.

18. The image printing apparatus according to claim 17, wherein the cutting unit is moved from the second waiting position to the first waiting position in parallel with a conveyance operation of conveying the printing medium to a cutting position of the cutting unit, in the case where the printing of the image on the printing medium by the print head is completed.

19. The image printing apparatus according to claim 17, wherein the cutting unit is moved from the second waiting position to the first waiting position in parallel with the movement operation of the detection unit to the detection start position.

20. An image printing apparatus comprising:
a print head configured to print an image on a printing medium;
a conveyance unit configured to convey the printing medium in a conveyance direction;
a detection unit movable in an intersection direction intersecting the conveyance direction and configured to detect an end of the printing medium in the intersection direction;
a cutting unit located downstream of a printing region of the print head in the conveyance direction and capable of cutting the printing medium by being moved in the intersection direction; and
a control unit configured to control movement of the detection unit such that the detection unit detects a position of the end of the printing medium during movement of the cutting unit for a cutting operation of cutting the printing medium,
wherein the control unit:
causes the detection unit to detect a leading edge position of the printing medium by conveying the printing medium upstream with respect to the conveyance direction after completion of a cutting operation by the cutting unit, and
corrects a cutting position set in advance based on a distance between the set cutting position and a position of the detection unit and a conveyance amount up to a point of detection of the leading edge position.

21. The image printing apparatus according to claim 20, wherein the control unit executes the detection operation of the leading edge position after setting of the printing medium to the image printing apparatus.

22. The image printing apparatus according to claim 20, wherein the control unit executes the detection operation of the leading edge position after setting of the printing medium to the image printing apparatus and in the case where print data of the next page is absent.

23. A method of controlling an image printing apparatus including:
a print head configured to print an image on a printing medium;
a conveyance unit configured to convey the printing medium in a conveyance direction;
a detection unit movable in an intersection direction intersecting the conveyance direction and configured to detect an end of the printing medium in the intersection direction; and a cutting unit located downstream of a printing region of the print head in the conveyance direction and capable of cutting the printing medium by being moved in the intersection direction, the method comprising the steps of:

moving the cutting unit for a cutting operation of cutting the printing medium wherein, in a case where an upstream side, with respect to the conveyance direction, of the printing medium on which the image has been printed by the print head is cut, when the cutting unit is moving, the detection unit moves from a detection start position on the printing medium to the end of the printing medium in order to detect the end of the printing medium.

24. The method according to claim 23, wherein, in the case where the position of the end to be detected by the detection unit is on the same side as an end from which the cutting of the printing medium by the cutting unit is to be started in the intersection direction, the detection unit detects the position of the end before the cutting of the printing medium by the cutting unit or after the start of cutting of the printing medium by the cutting unit.

25. The method according to claim 23, wherein, in the case where the position of the end to be detected by the detection unit is on the same side as an end at which the cutting of the printing medium by the cutting unit is to be completed in the intersection direction, the detection unit detects the position of the end before the completion of cutting of the printing medium by the cutting unit.

* * * * *